US006587947B1

(12) United States Patent
O'Donnell et al.

(10) Patent No.: US 6,587,947 B1
(45) Date of Patent: Jul. 1, 2003

(54) SYSTEM AND METHOD FOR VERIFICATION OF OFF-CHIP PROCESSOR CODE

(75) Inventors: Amy O'Donnell, Chandler, AZ (US); George Thangadurai, Santa Clara, CA (US); Anand Rajan, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/283,062

(22) Filed: Apr. 1, 1999

(51) Int. Cl.[7] ................. G06F 11/30; G06F 12/14
(52) U.S. Cl. ............ 713/187; 713/161; 713/167; 713/170; 713/172; 713/189; 713/200
(58) Field of Search .................. 713/1, 100, 151, 713/161, 164, 167, 170, 172, 174, 187, 189, 200, 201, 202; 714/38; 705/65, 66, 67; 709/100; 712/277, 224

(56) References Cited

U.S. PATENT DOCUMENTS

| 4,206,315 A | 6/1980 | Matyas et al. ............... 178/22 |
| 4,215,421 A | 7/1980 | Giraud ....................... 364/900 |
| 4,271,482 A | 6/1981 | Giraud ....................... 364/900 |
| 4,462,076 A | * 7/1984 | Smith, III ................... 463/29 |
| 4,578,531 A | 3/1986 | Everhart et al. ......... 178/22.08 |
| 4,951,280 A | 8/1990 | McCool et al. .......... 370/85.12 |
| 5,005,200 A | 4/1991 | Fischer ...................... 380/300 |
| 5,097,505 A | 3/1992 | Weiss ......................... 380/23 |
| 5,142,579 A | 8/1992 | Anderson .................. 380/30 |
| 5,214,702 A | 5/1993 | Fischer ....................... 380/30 |
| 5,231,666 A | 7/1993 | Matyas ....................... 380/25 |
| 5,323,465 A | 6/1994 | Avarne ....................... 380/23 |
| 5,699,428 A | 12/1997 | McDonnal et al. ............ 380/4 |
| 5,802,277 A | * 9/1998 | Cowlard ..................... 713/200 |
| 5,844,986 A | * 12/1998 | Davis ......................... 713/187 |

* cited by examiner

*Primary Examiner*—Justin T. Darrow
(74) *Attorney, Agent, or Firm*—Blakely, Sokoloff, Taylor & Zafman LLP

(57) ABSTRACT

An electronic system and corresponding method for verifying the integrity of code that is stored off-chip. The electronic system comprises a memory element to store Processor Abstraction Layer (PAL) code and a processor coupled to the memory element. The processor verifies the integrity of the PAL code prior to execution of the PAL code.

18 Claims, 5 Drawing Sheets

SYSTEM AND METHOD FOR VERIFICATION OF OFF-CHIP PROCESSOR CODE

BACKGROUND

1. Field

This invention relates to the field of electronics. More particularly, the invention relates to an apparatus and method for integrity verification of code that is stored off-chip.

2. Related Art

Normally, one of the most critical elements for an electronic device is its processor. In general, a processor is an embedded controller that comprises an integrated circuit (IC) including processing logic and on-chip memory. The memory is considered to be "on-chip" if placed on a die forming the IC. For 32-bit Intel® microprocessor architectures (e.g., Intel® IA-32processors), all architecture functionality is implemented on-chip using a combination of hardware and microcode stored in the on-chip memory.

With the development of 64-bit Intel® microprocessor architectures (e.g., Intel® IA-64 processors), some non-performance critical architecture functionality is being considered for implementation in off-chip firmware code. The use of off-chip firmware code provides a few advantages.

One advantage is that the current die size constraints associated with IA-32 processors can be maintained or even reduced for subsequent generation technologies. For instance, additional run-time services can be added without increasing the size of the on-chip memory, and hence, the die size of the processor. Another advantage is that the overall performance of the processor can be enhanced. This is due to the fact that a lesser amount of architecture functionality is required to be placed in on-chip memory so that more die area is available for processing logic.

However, this off-chip firmware code offers disadvantages as well. For instance, when moving architectural functionality off-chip, the firmware code is more susceptible to corruption and other malicious attacks.

Hence, it would be desirable to develop an apparatus and method of operation that ensure that the firmware code is free from corruption or unauthorized replacement. Also, the apparatus and method would ensure that the firmware code originated from a particular source.

SUMMARY OF THE INVENTION

Briefly, one embodiment of the invention is an electronic system comprising a memory element to store Processor Abstraction Layer (PAL) code and a processor coupled to the memory element. The processor verifies the integrity of the PAL code prior to execution of the PAL code.

BRIEF DESCRIPTION OF THE DRAWINGS

The features and advantages of the present invention will become apparent from the following detailed description of the present invention in which.

DESCRIPTION OF THE PREFERRED EMBODIMENT

Figure 1:
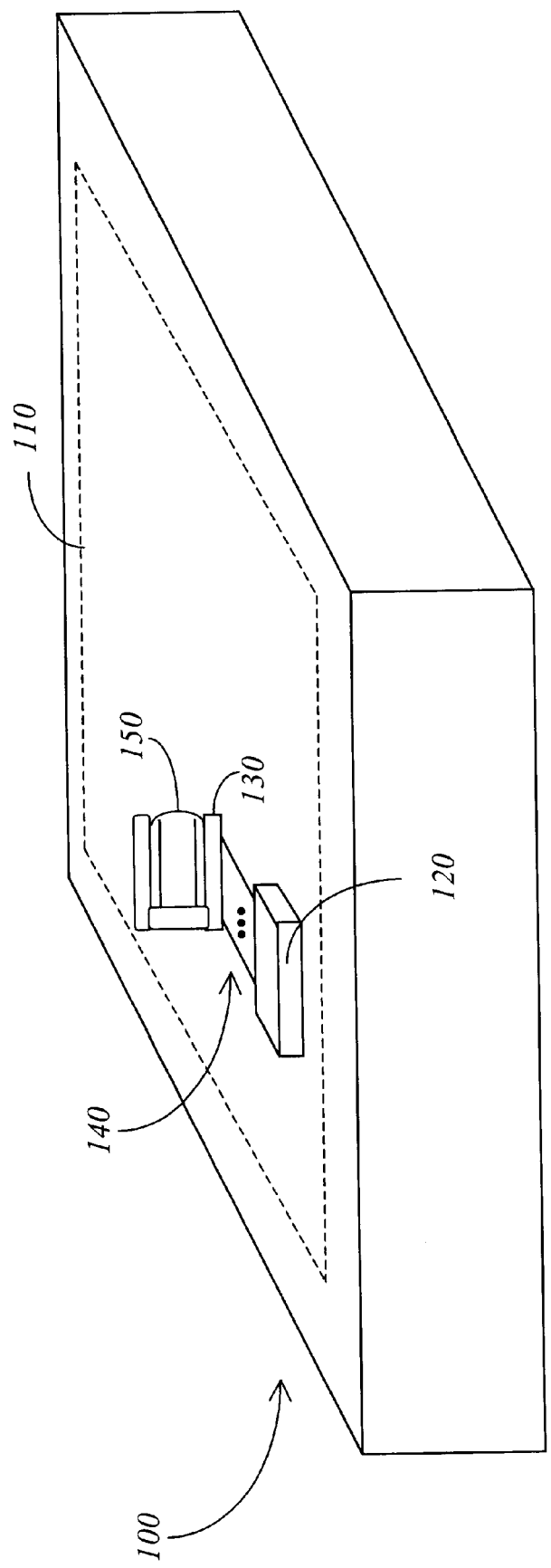
FIG. 1 is an illustrative embodiment of an electronic system operating in accordance with a verification scheme.

The present invention relates to an electronic system and corresponding method for verifying the integrity of code that is stored off-chip. Herein, certain embodiments of the invention are set forth in order to provide a thorough understanding of the invention. These embodiments should not be construed as a restriction on the scope of the invention. Also, to avoid unnecessarily obscuring the present invention, certain well-known hardware and techniques are not set forth in detail.

In the following description, terminology is used to discuss certain features of the present invention. For example, an "electronic system" is defined as any hardware having a processor. Examples of an electronic system include, but are not limited or restricted to the following: a computer (e.g., laptop, desktop, hand-held, server, mainframe, etc.), imaging equipment (e.g., printer, facsimile machine, scanner, digital camera, etc.), a set-top box (e.g., television control box for cable or satellite transmissions), wireless communication equipment (e.g., cellular phone, pager, etc.), a consumer electronic appliance and the like. A "processor" includes logic capable of processing information such as a microprocessor, a microcontroller, a state machine and the like. A "bus" is generally defined as a medium over which information may be transferred such as, for example, one or more electrical wire(s), fiber optic(s), cable(s), plain old telephone system (POTS) line(s), wireless channel(s) (e.g., satellite, radio frequency "RF", infrared, etc.) or even one or more logical links. "Information" is defined as data, address, control or any combination thereof.

With respect to cryptography related terminology, the term "secure" generally indicates a state where it is extremely difficult for an unauthorized individual to access information in a plain text format. For example, memory is "secure" if it is physically inaccessible when placed in the electronic system or its contents have been previously authenticated. A "key" is generally defined as an encoding and/or decoding parameter usually structured as a sequence of binary data.

A "digital signature" includes digital information signed with a private key of its signatory in accordance with a digital signature function. For clarity sake, one type of digital signature function described herein is a Digital Signature Algorithm (DSA) set forth in a 1998 publication entitled "Federal Information Processing Standards Publication 186-1" (Dec. 15, 1998). A digital signature is used to ensure that the digital information has not been illicitly modified after being digitally signed. This digital information may be provided in its entirety or in part after undergoing a one-way hash function. The "one-way hash function" includes a function, mathematical or otherwise, that converts information from a variable-length to a fixed-length (referred to as a "message digest"). The term "one-way" indicates that there does not readily exist an inverse function to recover any discernible portion of the original information from the fixed-length digest. Examples of a hash function include MD2 or MD5 provided by RSA Data Security of Redwood City, Calif., or Secure Hash Algorithm (SHA-1) as specified a 1995 publication Secure Hash Standard FIPS 180-1 entitled "Federal Information Processing Standards Publication" (Apr. 17, 1995).

In addition, a "digital certificate" includes digital information used to authenticate a sender of information. For example, a digital certificate may include information concerning a person or entity being certified that is encrypted with the private key of a certification authority. Examples of a "certification authority" include an original equipment manufacturer (OEM), a software vendor, a trade association, a governmental entity, a bank or any other trusted business or person.

Figure 5:
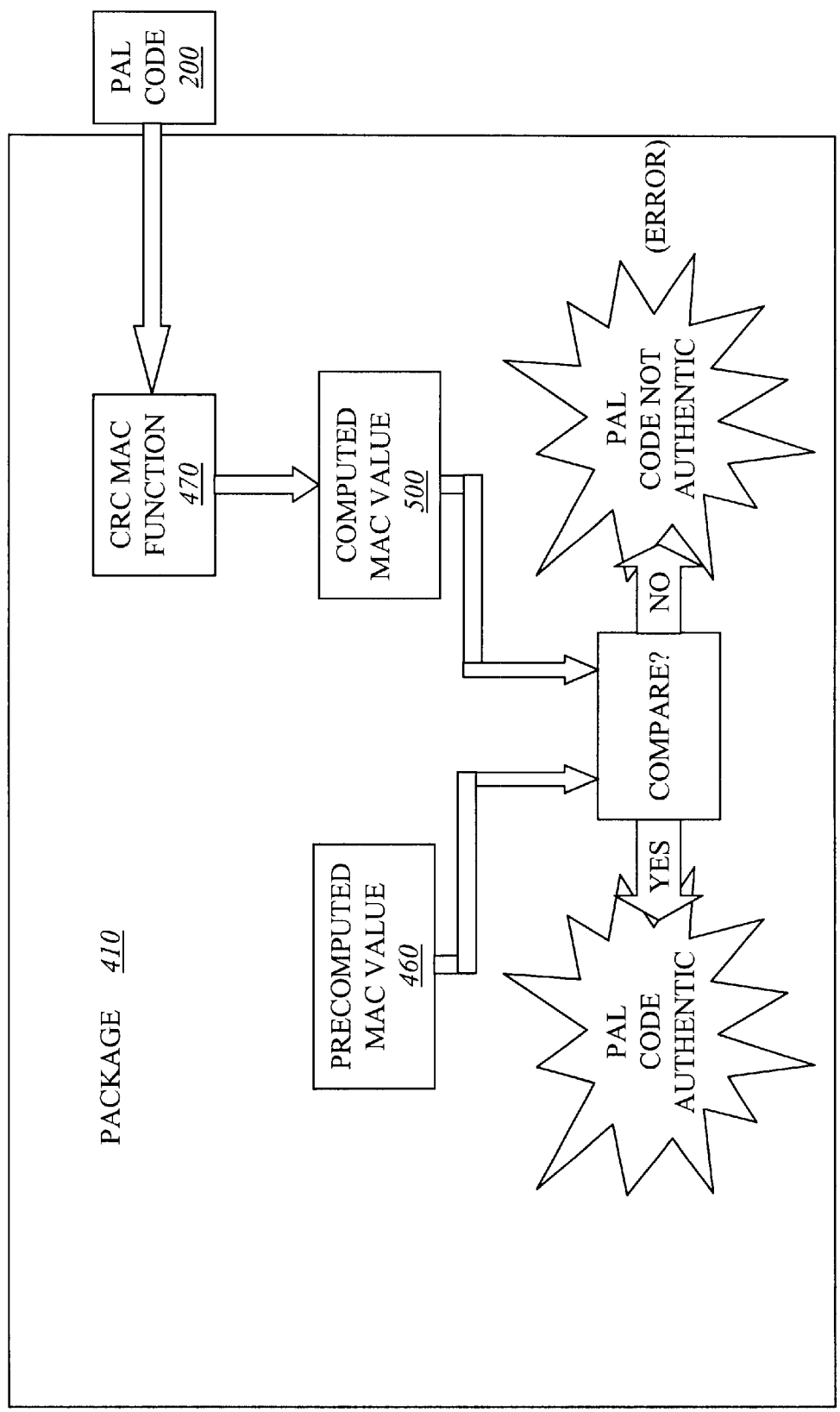
FIG. 5 is an illustrative diagram of a technique for verifying the PAL code contained in FIG. 2.

Referring to FIG. 1, an illustrative embodiment of an electronic system 100 operating in accordance with a verification scheme described in FIG. 5. Electronic system 100 (e.g., a computer) includes a system substrate 110 that controls the overall functionality of electronic system 100. Normally having a printed circuit board form factor, system substrate 110 comprises a memory element 120 and a connector 130.

As shown, memory element 120 comprises non-volatile memory such as Read Only Memory (ROM), any type of erasable programmable ROM (EPROM), flash memory and the like, although various types of volatile memory could be used (e.g., battery-backed random access memory). Memory element 120 is attached to system substrate 110 and is coupled to a bus 140. Bus 140 is routed to connector 130 in order to establish communications between memory element 120 and a processing unit 150 coupled to connector 130. Although connector 130 is shown as a standard female edge connector, any other style of connector may be used (e.g., a socket, lead frame, etc).

Figure 2:
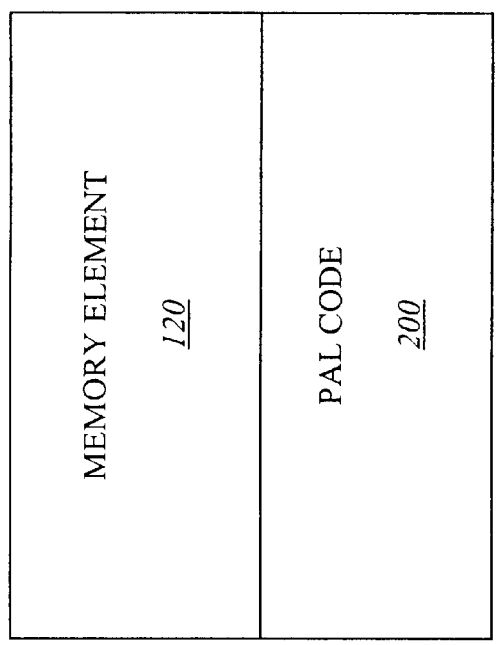
FIG. 2 is an illustrative embodiment featuring the contents of the memory element of FIG. 1.

As shown in FIG. 2, contents of memory element 120 include Processor Abstraction Layer (PAL) code 200. PAL code 200 comprises firmware that controls functionality of processing unit 150 but is not highly dependent on processor execution speed. For example, PAL code 200 may include (i) a processing unit reset function, (ii) a check function for internal initialization events, (iii) system management interrupt code that allows the electronic system to interrupt processing unit 150 and the like. Before execution of PAL code 200, processing unit 150 would need to verify the integrity of PAL code 200 before its execution.

Figure 3:
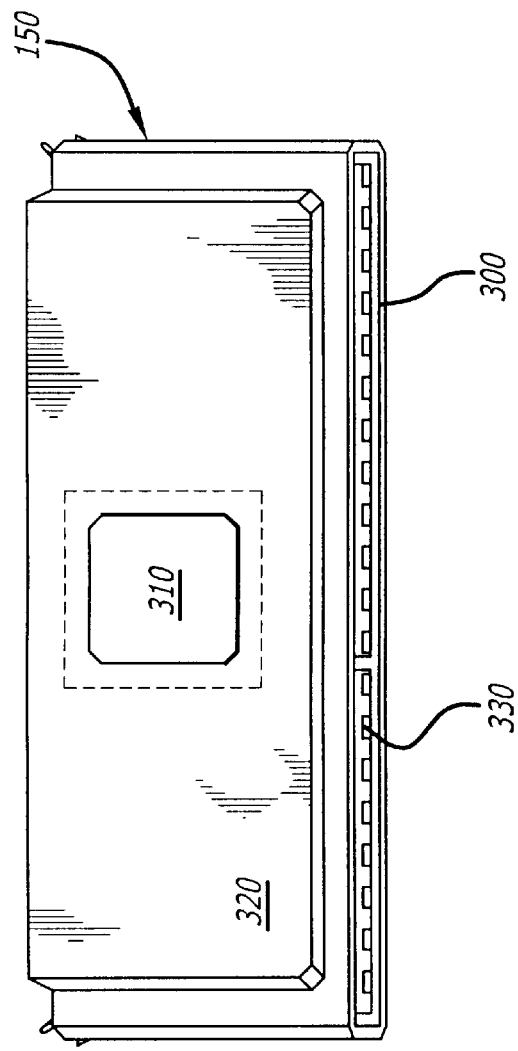
FIG. 3 is a first illustrative embodiment of processing unit of the electronic system of FIG. 1.

Referring now to FIG. 3, a first illustrative embodiment of processing unit 150 is shown. In this embodiment, processing unit 150 includes a processor substrate 300 formed from any type of material upon which integrated circuit components (not shown) can be attached through well-known techniques (e.g., solder connection, etc.). Processor substrate 300 includes a processor 310 that is covered by a package 320 in order to protect processor 310 from damage or harmful contaminants. Although a single processor 300 is shown, multiple processors may be placed on processor substrate 300. Processor substrate 300 further includes a connector 330, which protrudes from package 320 and is adapted to establish a mechanical and electrical connection with connector 130 of FIG. 1.

Figure 4:
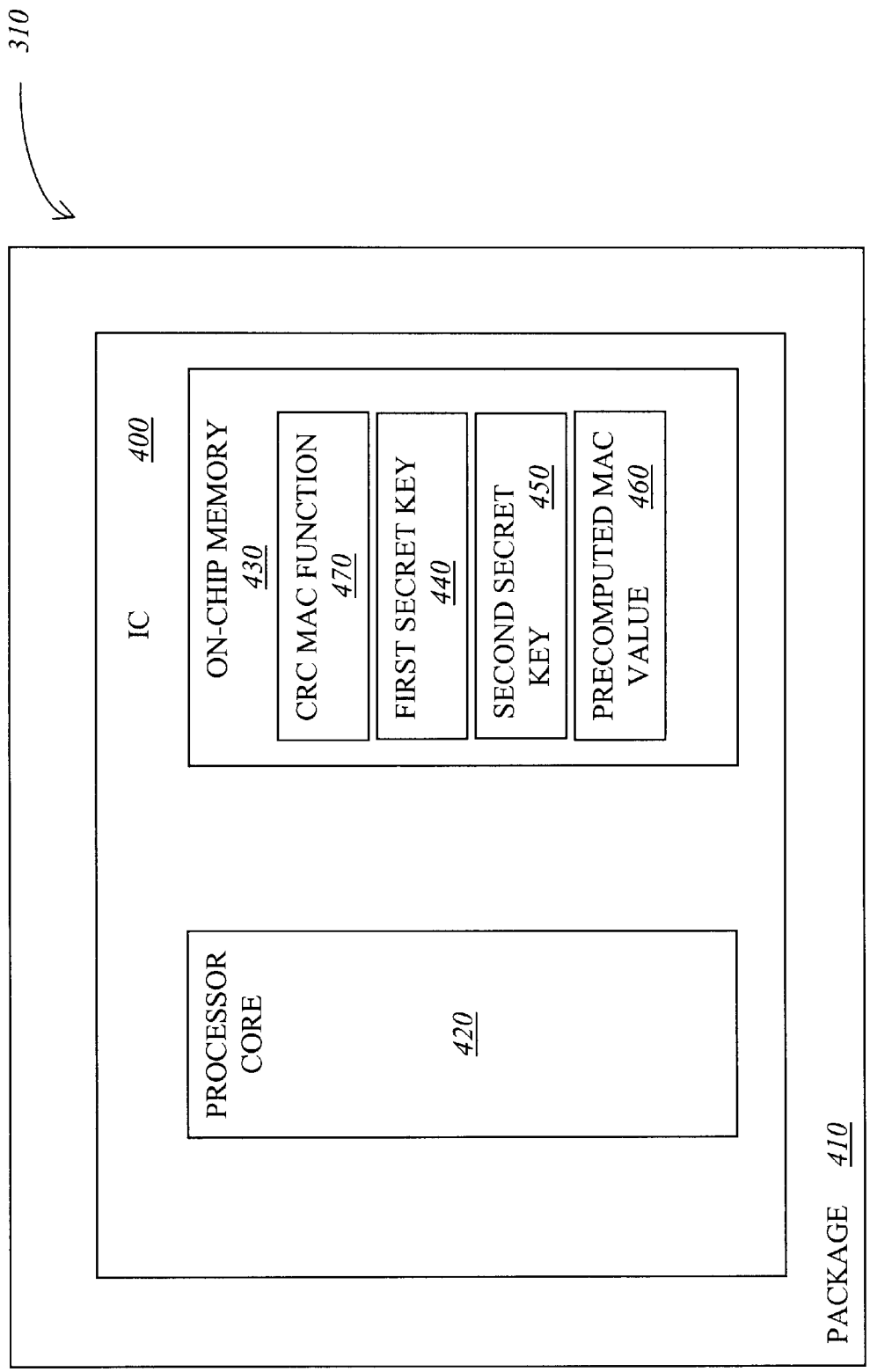
FIG. 4 is a second illustrative embodiment of the processing unit of the electronic system of FIG. 1.

Referring now to FIG. 4, a second illustrative embodiment of processing unit 150 is shown. In this embodiment, processing unit 150 simply includes processor 310 being an integrated circuit (IC) 400 substantially covered by an IC package 410. IC 400 includes processing logic (e.g., processor core) 420 and a local memory 430 (e.g., on-chip memory). IC package 410 is configured to protect IC 400 from damage or harmful contaminants. The structure of IC package 410 is selected for adaptation with connector 130. Local memory 430 contains a first secret key "P(x)" 440, a second secret key (K) 450, a pre-computed message authentication code (MAC) value 460 and a well-known cyclic redundancy check (CRC) MAC function 470 described on page 22 of a 1996 publication entitled "Message Authentication" by Dr. Hugo Krawczyk. Both keys 440 and 450 as well as pre-computed MAC value 460 are securely stored in local memory 430. Security techniques employed may include the use of tamper resistant software to obfuscate P(x) 440, K 450 and MAC value 460, protection mechanisms to damage the memory in the event that physical tampering of memory 430 is detected or to reduce the likelihood of extracting contents from memory 430, and the like.

More specifically, "P(x)" is an irreducible polynomial of degree N, where "N" is equal to sixty-four (64) in this embodiment and K is a randomly chosen word having a bit size equivalent to the degree of P(x). Since P(x) is arranged as a 64 degree polynomial, K is chosen as a random 64-bit word. It is contemplated that if P(x) were an irreducible polynomial of degree 128, K would be a 128-bit word. Pre-computed MAC value 460 is a message digest resulting from PAL code 200 undergoing a one-way hash function. The loading of the pre-computed MAC value 460 may be done at manufacture or subsequent thereto during an initialization procedure.

Referring now to FIG. 5, an illustrative diagram of a technique to verify PAL code 200 is shown. PAL code 200 is loaded into processor 310 and undergoes operations by CRC MAC function 470 to produce a computed MAC value 500. Internally within processor 310, computed MAC value 500 is compared with pre-computed MAC value 460 via comparison logic or firmware. If there is a match, namely a determination that both values are identical within a predetermined percentage or error (e.g., less than one percent), PAL code has not been modified since the loading of the pre-computed MAC value 460 via comparison logic or firmware. Hence, the integrity of PAL code 200 has been verified. Otherwise, if no match is detected, PAL code 200 has been modified. As a result, a system error is recorded and/or the electronic system is prevented from exiting the processor reset sequence. This may be accomplished by the processor remaining in the reset sequence (i.e., infinite loop), placing the processor into a SLEEP or reduced power mode, etc.

Figure 6:
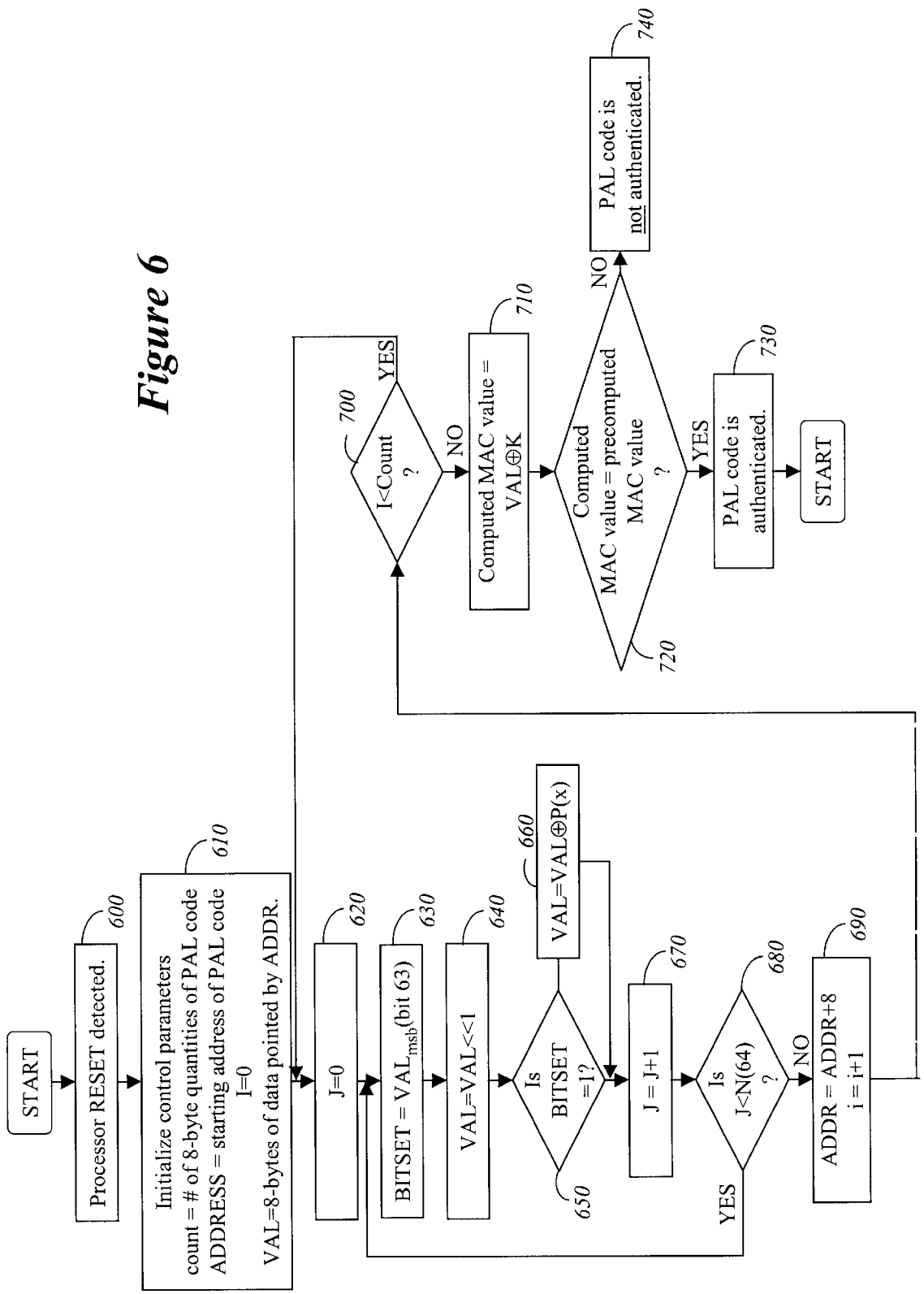
FIG. 6 is a more-detailed embodiment of the verification technique of FIG. 5.

Referring to FIG. 6, a more-detailed embodiment of the verification scheme conducted by processor 310 of FIG. 3, including execution of the CRC MAC function, is shown. In general, the PAL code is generally divided by the first secret key P(x) to produce a residue value "Y(x)" as set forth in equation (1) shown below. The residue value Y(x) is exclusive-OR'ed (XOR'ed) with the second secret key (K) to calculate the MAC value as set forth in equation (2).

(1) $Y(x) = M(x) (x^{64} \bmod P(x))$; where
   "M(x)" is PAL code represented as a polynomial
   "Y(x)" is a 64-bit word operating as a remainder or residue.

(2) MAC value = $Y(x)$ XOR K

As shown in FIG. 6, in this embodiment, a processor RESET is detected (block 600). In response, the off-chip code verification scheme begins by performing the CRC MAC function. First, control parameters are initialized (block 610). These control parameters include (i) a first counter (COUNT) which is set to the number of 8-byte quantities forming the PAL code, and (ii) a second counter (I) is set to zero. A pointer (ADDRESS) is set to a starting address of the PAL code while a storage parameter (VAL) is set to include an 8-byte quantity of data at ADDRESS.

Next, a bit counter (J) is set to zero (block 620) and BITSET is set to contain the most significant bit for data associated with VAL (block 630). VAL undergoes modulo 2 division through a single-bit left shift operation and the bit value of BITSET is checked (blocks 640 and 650). If BITSET is determined to be active (e.g., a logic "1"), VAL is updated by exclusively OR'ing itself with P(x) and the bit counter (J) is incremented (blocks 660 and 670). Otherwise, if BITSET is not active, the bit counter (J) is merely incremented (block 670). If J<N (N=64 in this embodiment), the division operation continues (block 680) for each bit of the selected 8-bytes of PAL code.

Upon completing the logical division of the first 8-bytes of PAL code, ADDRESS is incremented to point to the next block of PAL code, second counter (I) is incremented and if the CRC MAC function has not been performed on the entire PAL code, the CRC MAC function is performed on the next segment of PAL code (blocks 690 and 700). In the event that the entire PAL code has undergone the CRC MAC function, the remaining value of VAL, equivalent to the residue Y(x), is XOR'ed with the second secret key (K) to produce the computed MAC value (block 710). The computed MAC value is compared with the precomputed MAC value (block 720). If a match is determined, the PAL code is authenticated and the electronic system will proceed with its boot sequence (block 730). Otherwise, the PAL code has been corrupted and the electronic system will not boot (block 740).

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An electronic system comprising:
   a memory element to store Processor Abstraction Layer (PAL) code; and
   a processor coupled to the memory element and including a first secret key, a second secret key, and a pre-computed message authentication code (MAC) value, the processor to verify the integrity of the PAL code prior to execution of the PAL code.

2. The electronic system of claim 1, wherein the verification of the PAL code occurs prior to releasing the processor from a RESET state.

3. The electronic system of claim 1, wherein the processor further includes a cyclic redundancy check message authentication code (CRC MAC) function.

4. The electronic system of claim 3, wherein the first secret key is an irreducible polynomial of degree N, where N is a positive whole number.

5. The electronic system of claim 4, wherein the second secret key is a random N-bit word.

6. The electronic system of claim 3, wherein the pre-computed MAC value includes a message digest being a result of a hash operation on the PAL code according to a selected hash function.

7. The electronic system of claim 6, wherein upon receiving the PAL code, the processor executes the CRC MAC function to produce a computed MAC value.

8. The electronic system of claims 7, wherein the PAL code is verified if the computed MAC value matches the pre-computed MAC value.

9. The electronic system of claim 1, wherein both the memory element and the processor are coupled to a substrate covered by a package, the substrate having a connector protruding from the package.

10. An electronic system comprising:
    a first substrate; and
    a processing unit coupled to the first substrate, the processing unit including
    a second substrate,
    a processor placed on the second substrate comprises a first secret key, a second secret key, and a pre-computed message authentication code (MAC) value, and
    an on-substrate memory element coupled to the processor and placed on the second substrate, the on-substrate memory element containing Processor Abstract Layer (PAL) code having its integrity verified by the processor before execution of the PAL code and prior to releasing the processor from a RESET state.

11. The electronic system of claim 10, wherein the processor of the processing unit further includes a cyclic redundancy check message authentication code (CRC MAC) function.

12. The electronic system of claim 11, wherein the pre-computed MAC value includes a message digest being a result of a hash operation on the PAL code according to a selected hash function.

13. The electronic system of claim 12, wherein upon receiving the PAL code, the processor executes the CRC MAC function to produce a computed MAC value in order to verify that the PAL code has not been tampered when the computed MAC value matches the precomputed MAC value.

14. The electronic system of claim 10, wherein the first secret key is an irreducible polynomial of degree N and the second key is a random N-bit word, where N is a number having a factor of 2.

15. The electronic system of claim 10, wherein the processing unit is covered by a package with an edge connector of the second substrate protruding from the package.

16. An electronic system comprising:
    memory means for storing Processor Abstraction Layer (PAL) code; and
    processing means for verifying the integrity of the PAL code during a reset sequence before executing the PAL code the processing means including a first secret key, a second secret key, and a pre-computed message authentication code (MAC) value.

17. A method comprising:
    loading code from a memory element to a local memory of a processor, the memory element is remotely situated from the processor;
    performing a cyclic redundancy check message authentication code (CRC MAC) function on the code to produce a computed MAC value;
    comparing the computed MAC value to a pre-computed MAC value prestored in the local memory of the processor; and
    allowing the processor to execute the code if the computed MAC value matches the precomputed MAC value.

18. The method of claim 17 further comprising:
    preventing the processor from executing the code if the computed MAC value fails to match the pre-computed MAC value.

* * * * *